United States Patent
Willborn et al.

(10) Patent No.: US 8,451,964 B2
(45) Date of Patent: May 28, 2013

(54) CODE BLOCK INTERFERENCE CANCELLATION

(75) Inventors: Thomas B. Willborn, San Diego, CA (US); Supratik Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/032,087

(22) Filed: Feb. 22, 2011

(65) Prior Publication Data

US 2011/0206170 A1 Aug. 25, 2011

Related U.S. Application Data

(60) Provisional application No. 61/307,273, filed on Feb. 23, 2010.

(51) Int. Cl.
- *H03D 1/04* (2006.01)
- *H03D 1/06* (2006.01)
- *H03K 6/04* (2006.01)
- *H04B 1/10* (2006.01)
- *H04L 1/00* (2006.01)

(52) U.S. Cl.
USPC ............................... 375/346; 375/316

(58) Field of Classification Search
USPC ........................................ 375/346
See application file for complete search history.

(56) References Cited

U.S. PATENT DOCUMENTS

| | | | |
|---|---|---|---|
| 6,324,382 B1 | 11/2001 | Dolder | |
| 6,618,453 B1 | 9/2003 | Lundby | |
| 7,295,636 B2 | 11/2007 | Onggosanusi et al. | |
| 2002/0064246 A1* | 5/2002 | Kelkar et al. | 375/347 |
| 2002/0119803 A1* | 8/2002 | Bitterlich et al. | 455/552 |
| 2004/0259504 A1 | 12/2004 | Onggosanusi et al. | |
| 2008/0098273 A1* | 4/2008 | Blankenship et al. | 714/746 |
| 2008/0150144 A1 | 6/2008 | Park | |
| 2011/0149904 A1* | 6/2011 | Fong et al. | 370/331 |
| 2012/0039208 A1* | 2/2012 | Aydin | 370/252 |
| 2012/0051311 A1* | 3/2012 | Kim et al. | 370/329 |
| 2012/0057551 A1* | 3/2012 | Kim et al. | 370/329 |

FOREIGN PATENT DOCUMENTS

| | | |
|---|---|---|
| GB | 2279851 A | 1/1995 |
| WO | WO2008114957 A1 | 9/2008 |
| WO | WO2008150144 A2 | 12/2008 |
| WO | WO2009157184 A1 | 12/2009 |

OTHER PUBLICATIONS

J. Andrews, et al., "Analysis of Cancellation Error for Successive Interference Cancellation with Imperfect Channel Estimation," Multiuser Wireless Communications (Fall 2002), pp. 1-17.
Y. Chang, et al., "DSP Implementation of Successive Interference Cancellation (SIC) Receiver of 3GPP WCDMA Uplink Transmission," National Science Council of R.O.C. (2003), pp. 1-29.
International Search Report and Written Opinion—PCT/US2011/025947, ISA/EPO—Jul. 4, 2011.

* cited by examiner

*Primary Examiner* — Erin File
(74) *Attorney, Agent, or Firm* — Kenneth Vu

(57) ABSTRACT

Certain aspects of the present disclosure propose an interference cancellation method based on the sub-blocks inside a block. For example, in the long term evolution (LTE) standard, the sub-blocks may be code blocks and the blocks may be transport block.

20 Claims, 4 Drawing Sheets

CODE BLOCK INTERFERENCE CANCELLATION

CLAIM OF PRIORITY UNDER 35 U.S.C. §119

The present Application for Patent claims priority to U.S. Provisional Application No. 61/307,273, entitled, "CODE BLOCK INTERFERENCE CANCELLATION IN LTE," filed Feb. 23, 2010, and assigned to the assignee hereof and expressly incorporated herein by reference.

TECHNICAL FIELD

Certain aspects of the present disclosure generally relate to wireless communications and, more particularly, to systems and methods for cancelling interference in a wireless communication system.

BACKGROUND

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

In Long Term Evolution (LTE), a release of Universal Mobile Telecommunication System (UMTS) that uses evolved Universal Terrestrial Radio Access (E-UTRA), multiple transport blocks may be sent on a single downlink channel to a mobile device simultaneously.

In typical wireless environments, these transmissions may interfere with each other to some extent. This interference decreases the probability that the mobile device will be able to decode each transport block without error. This higher likelihood of decoding errors may lead to lower data throughput and, thus, a less than optimal experience for users in the network.

SUMMARY

Certain aspects of the present disclosure provide a method for wireless communications. The method generally includes receiving a waveform for a plurality of transport blocks, each comprising a plurality of code blocks, successfully decoding one or more code blocks of one of the transport blocks, reconstructing a portion of the waveform utilizing the successfully decoded code blocks, and subtracting the reconstructed portion from the received waveform to cancel interference caused by the successfully decoded code blocks.

Certain aspects of the present disclosure provide an apparatus for wireless communications. The apparatus generally includes at least one processor configured to receive a waveform for a plurality of transport blocks, each comprising a plurality of code blocks, successfully decode one or more code blocks of one of the transport blocks, reconstruct a portion of the waveform utilizing the successfully decoded code blocks, and subtract the reconstructed portion from the received waveform to cancel interference caused by the successfully decoded code blocks; and a memory coupled with the at least one processor.

Certain aspects of the present disclosure provide an apparatus for wireless communications. The apparatus generally includes means for receiving a waveform for a plurality of transport blocks, each comprising a plurality of code blocks, means for successfully decoding one or more code blocks of one of the transport blocks, means for reconstructing a portion of the waveform utilizing the successfully decoded code blocks, and means for subtracting the reconstructed portion from the received waveform to cancel interference caused by the successfully decoded code blocks.

Certain aspects provide a computer-program product for wireless communications, comprising a computer readable medium having instructions stored thereon. The instructions being executable by one or more processors for receiving a waveform for a plurality of transport blocks, each comprising a plurality of code blocks, successfully decoding one or more code blocks of one of the transport blocks, reconstructing a portion of the waveform utilizing the successfully decoded code blocks, and subtracting the reconstructed portion from the received waveform to cancel interference caused by the successfully decoded code blocks.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
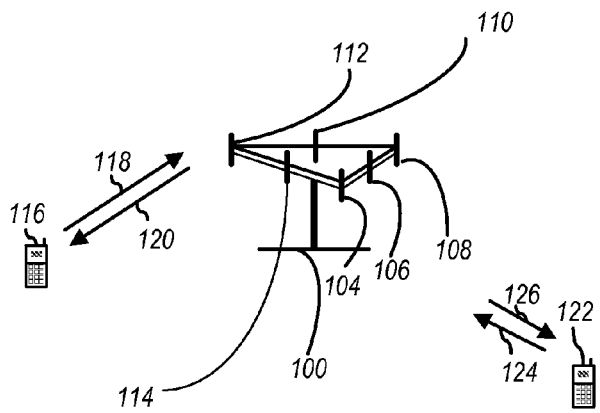
FIG. 1 illustrates a multiple access wireless communication system, in accordance with certain aspects of the present disclosure.

Referring to FIG. 1, a multiple access wireless communication system according to one embodiment is illustrated. An access point 100 (AP) includes multiple antenna groups, one including 104 and 106, another including 108 and 110, and an additional including 112 and 114. An access point (AP) may also be referred to as a base station (BS), eNodeB, or simply eNB. In FIG. 1, only two antennas are shown for each antenna group, however, more or fewer antennas can be utilized for each antenna group. Access terminal 116 (AT) is in communication with antennas 112 and 114, where antennas 112 and 114 transmit information to access terminal 116 over forward link 120 and receive information from access terminal 116 over reverse link 118. An access terminal (AT) may also be referred to as a user terminal (UT), mobile station (MS), or user equipment (UE). Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 can use different frequency for communication. For example, forward link 120 can use a different frequency then that used by reverse link 118.

Each group of antennas and/or the area in which they are designed to communicate is often referred to as a sector of the access point. In the embodiment, respective antenna groups are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point can be a fixed station used for communicating with the terminals and can also be referred to as an access point, a Node B, or some other terminology. An access terminal can also be called an access terminal, user equipment (UE), a wireless communication device, terminal, access terminal or some other terminology.

Figure 2:
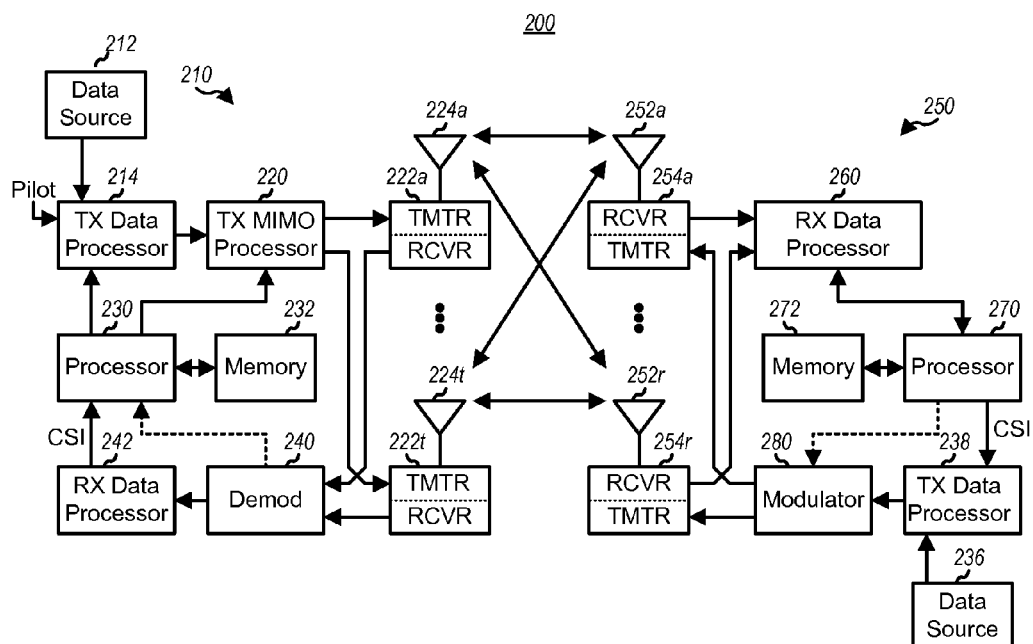
FIG. 2 illustrates a block diagram of a communication system, in accordance with certain aspects of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 230.

The modulation symbols for respective data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise a Broadcast Control Channel (BCCH), which is a DL channel for broadcasting system control information; a Paging Control Channel (PCCH), which is a DL channel that transfers paging information; and a Multicast Control Channel (MCCH), which is a point-to-multipoint DL channel used for transmitting Multimedia Broadcast and Multicast Service (MBMS) scheduling and control information for one or several MTCHs. Generally, after establishing an RRC connection this channel is only used by user equipments (UEs) that receive MBMS (Note: old MCCH+MSCH). Dedicated Control Channel (DCCH) is a point-to-point bi-directional channel that transmits dedicated control information and used by UEs having an RRC connection. In an aspect, Logical Traffic Channels comprise a Dedicated Traffic Channel (DTCH), which is a point-to-point bi-directional channel, dedicated to one UE, for the transfer of user information; and a Multicast Traffic Channel (MTCH), which is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAR (at any given time, the channel is contiguous or uniformly spaced in frequency) properties of a single carrier waveform.

Code Block Interference Cancellation

Certain aspects of the present disclosure provide techniques to support interference cancellation per sub-block in a wireless communication system. The interference cancellation techniques presented herein may help reduce or eliminate interference caused by each sub-block after receiving a message that includes one or more blocks, each of which including one or more sub-blocks.

For example, according to certain aspects, if a system utilizes Evolved Universal Terrestrial Radio Access (E-UTRA) known also as the long term evolution (LTE) standard, the blocks may be transport blocks (TBs) and the sub-blocks may be the code blocks (CBs). The techniques presented herein may cancel interference per code block. According to certain aspects, the techniques presented herein may be applied to a waveform that corresponds to a physical downlink shared channel (PDSCH) transmitted in accordance with a Long Term Evolution standard.

In LTE, multiple transport blocks may be transmitted simultaneously on the PDSCH to a user equipment (UE). In a typical wireless environment, these transmissions may interfere with each other. The interference from other transport blocks may decrease probability of correctly decoding each transport block at the UE. As noted above, a higher likelihood of decoding errors may lead to lower data throughput, and a less than optimal experience for users in the network.

For conventional interference cancellation algorithms, in order for a UE to be able to mitigate the interference from multiple transport blocks, at least one of the simultaneously received transport blocks typically needs be decoded correctly without the use of any interference cancellation method.

According to these algorithms, assuming that a transport block is decoded correctly, the information bits contained in that transport block that are transmitted by an evolved node B (eNB) will then be known at the receiver (e.g., UE). The receiver may then re-encode those information bits and reconstruct a portion of the received waveform corresponding to transmission of that transport block. The UE may then subtract the reconstructed waveform from the total received waveform in an effort to accomplish interference cancellation.

Unfortunately, such algorithms may not be used when none of the transport blocks are decoded correctly. In that case, as no transport block was successfully decoded, no portion of the received waveform can be reconstructed reliably enough to reduce the interference.

Certain aspects of the present disclosure, however, provide techniques that may help remove interference that a transport block has on all other transport blocks, even when that transport block is not successfully decoded. According to certain aspects, such an interference cancellation technique may take advantage of the structure of the transport blocks sent on the PDSCH channel as defined by the LTE standard.

For example, each transport block may be constructed by concatenating one or more code blocks. When attempting to decode a transport block, a UE may first successfully decode each of the code blocks contained in the transport block. If any of the code blocks cannot be decoded successfully, then decoding of the transport block may fail. However, there may be some code blocks in the transport block that have been decoded successfully.

Figure 3:
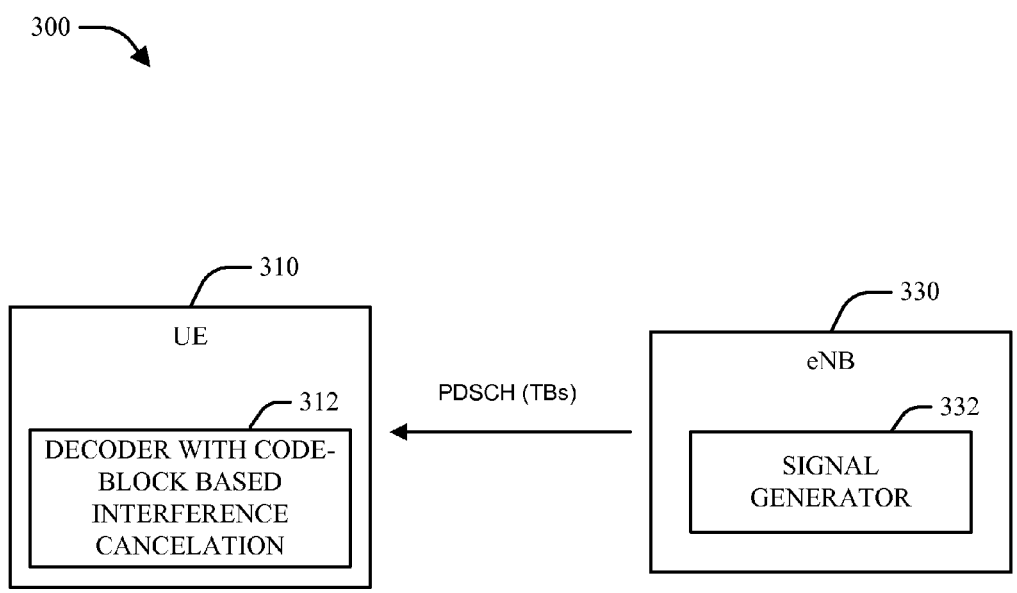
FIG. 3 illustrates an example wireless communication system, in accordance with certain aspects of the present disclosure.

FIG. 3 illustrates a block diagram of an example wireless communications system 300 in which the code-block based interference cancellation techniques presented herein may be practiced.

System 300 may include one or more UEs (terminals, mobile or wireless stations, etc.), such as UE 310. UE 310 can communicate with one or more eNBs 330 (base stations, access points, Node Bs, network cells, etc.) on an uplink and/or downlink. In an aspect, UE 310 and eNB 330 can include any number of antennas (not shown) for UL/DL communication within system 300.

In various wireless communication deployments, respective UEs can be configured with different levels of capability. For example, for an LTE system, UE 310 may be capable of simultaneously receiving multiple transport blocks (TBs) transmitted by the eNB 330 in a PDSCH. The eNB may include a signal generator 332 that generates the transmitted signal for the PDSCH by concatenating a plurality of code blocks (CBs) for each TB. The signal generator 332 may generate an error code or checksum (e.g., a CRC) for each code block, as well as a CRC for each TB.

As illustrated, the UE 310 may include a decoder 312 that performs code block-based interference cancellation as described herein. In other words, the decoder 312 may apply interference cancellation using each successfully decoded code block, even if an entire transport block is not successfully decoded.

According to certain aspects of the present disclosure, a UE implementing code block based interference cancellation may re-encode and reconstruct the received waveform based on such successfully decoded code blocks in the transport block, regardless of whether or not the entire transport block was decoded correctly. The UE may then subtract the reconstructed waveform from the received waveform to accomplish interference cancellation, which may help in decoding other transport blocks. By re-encoding information in the successfully decoded code blocks and reconstructing the portion of the received waveform utilizing the re-encoded information, interference may be cancelled on a code block basis rather than a transport block basis.

According to certain aspects, the UE may be configured to perform interference cancellation by performing a plurality of iterations of interference cancellation on the waveform, wherein each iteration comprises reconstructing a different portion of the waveform utilizing one or more successfully decoded code blocks, and subtracting the reconstructed portion from the waveform.

It is typically more likely that one or more code blocks will be successfully decoded than entire transport blocks. As a result, the code-block based technique presented herein may lead to more frequent application of interference cancellation when compared to transport-block based interference cancellation, which may result in higher data throughput and a better user experience.

Figure 4:
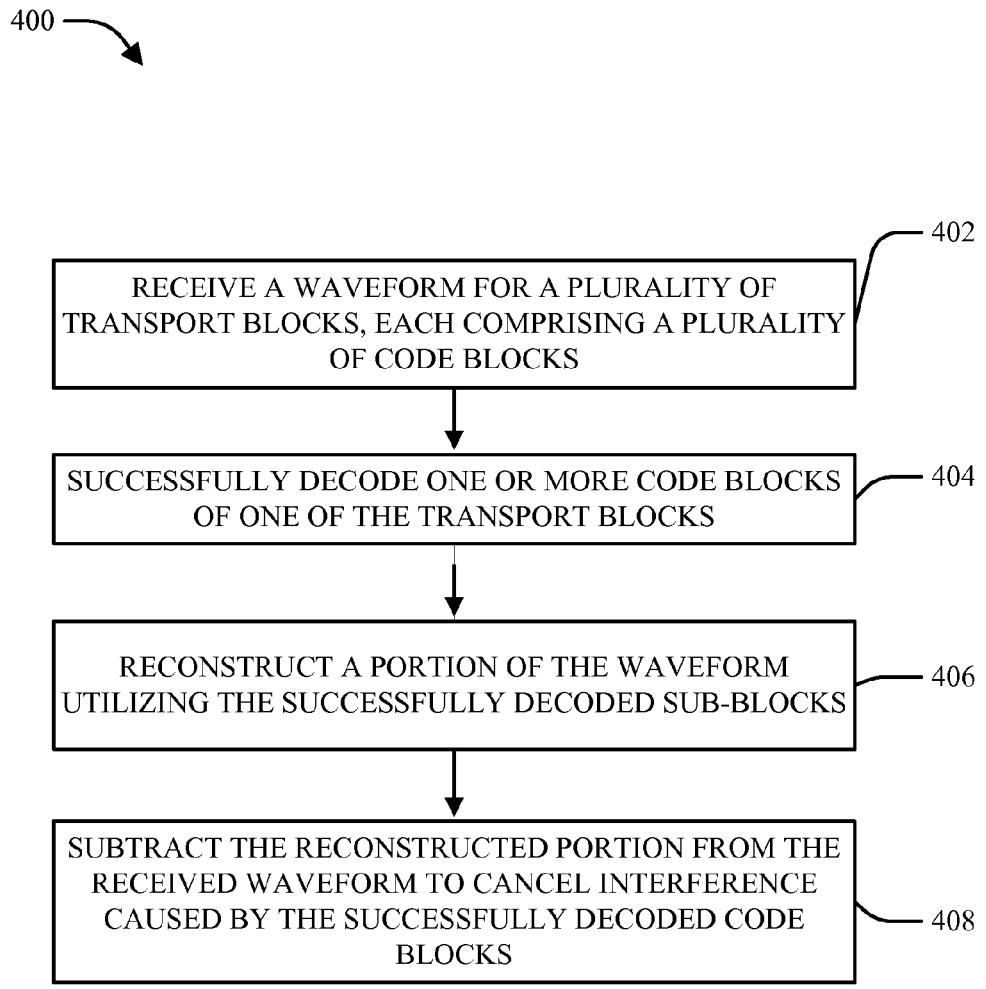
FIG. 4 illustrates example operations that may be performed by a user terminal for code block successive interference cancellation, in accordance with certain aspects of the present disclosure.

FIG. 4 illustrates example operations 400 for code block successive interference cancellation, in accordance with certain aspects of the present disclosure. The operations may be performed, for example, by a UE, such as the UE 310 described above. The operations may be implemented, for example, by one or more processors, such as the receive processor 260 and/or processor 270 of receiver system 250 shown in FIG. 2.

The operations 400 begin, at 402, by receiving a transmitted waveform for a plurality of transport blocks, each comprising a plurality of code blocks. One or more code blocks of one of the transport blocks are successfully decoded, at 404. At 406, a portion of the waveform is reconstructed utilizing the successfully decoded sub-blocks. At 408, the reconstructed portion is subtracted from the received waveform to cancel interference caused by the successfully decoded code blocks.

The operations 404-408 may be performed iteratively to successively cancel interference from the received waveform based on successfully decoded code blocks. Each iteration a different portion of the waveform may be reconstructed based on the successfully decoded code blocks, and subtracting from the received waveform.

According to certain aspects, the interference cancellation presented herein may be dynamically enabled and disabled. For example, the techniques presented herein may be most advantageously applied when channel conditions are good and interference to code blocks is largely due to other code blocks. Therefore, according to certain aspects, interference cancellation may be enabled only when monitored channel conditions (e.g., as indicated by some type of channel quality parameter) are good (e.g., with some channel condition parameter exceeding a predetermined threshold). Conversely, interference cancellation may be disabled when monitored channel conditions are poor (e.g., with some channel condition parameter falling below a predetermined threshold). This approach may help reduce power consumption at a UE, by avoiding the additional processing involved in code block based interference cancellation when it may be of little benefit. Thresholds for enabling and disabling interference cancellation may be configurable (e.g., as a factory setting or by a user) and may be different, for example, to provide hysteresis.

Certain aspects of the present disclosure allow interference cancellation to be performed even if only a single code block in a transport block is decoded successfully, rather than requiring successful decoding of an entire transport block. Generally, probability of a code block being decoded successfully is much larger than probability of a transport block being decoded successfully. Because the code-base technique may perform interference cancellation on a received signal even if none of the transport blocks in the received signal can be decoded successfully, higher data throughput may be achieved.

Figure 4A:
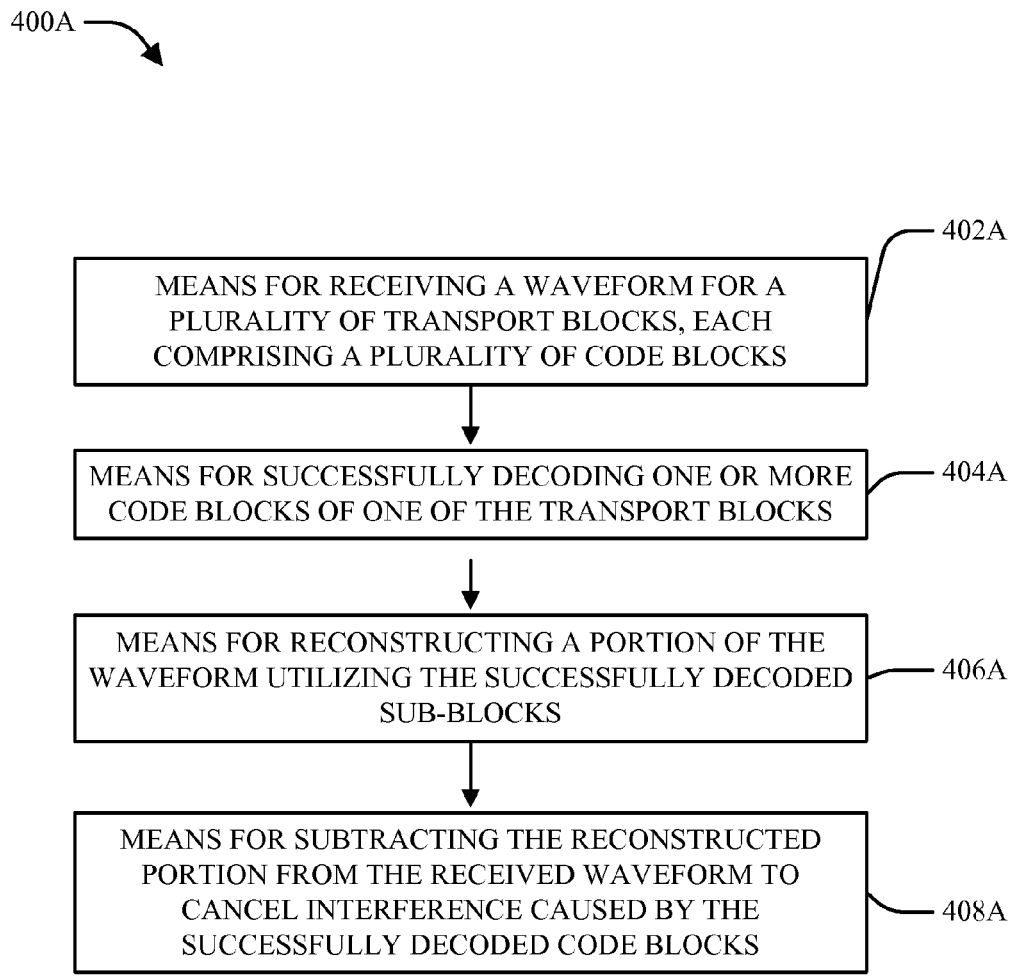
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 402-410 illustrated in FIG. 4 correspond to means-plus-function blocks 402A-480A illustrated in FIG. 4A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for wireless communications, comprising:
    receiving a waveform for a plurality of transport blocks, each transport block comprising a plurality of code blocks;
    successfully decoding one or more code blocks of one of the plurality of transport blocks;
    reconstructing a portion of the waveform utilizing the successfully decoded code blocks; and
    subtracting the reconstructed portion from the received waveform to cancel interference caused by the successfully decoded code blocks.

2. The method of claim 1, wherein the waveform corresponds to a physical downlink shared channel (PDSCH).

3. The method of claim 1, further comprising:
    monitoring channel quality; and
    dynamically enabling interference cancellation using the reconstructed portion of the waveform based on the successfully decoded code blocks when the monitored channel quality is above a threshold value.

4. The method of claim 1, further comprising:
    performing a plurality of iterations of interference cancellation on the waveform, wherein each iteration comprises reconstructing a different portion of the waveform utilizing one or more successfully decoded code blocks, and subtracting the reconstructed portion from the waveform.

5. The method of claim 1, wherein reconstructing the portion of the received message comprises:
    re-encoding information in the successfully decoded code blocks; and
    reconstructing the portion of the received waveform utilizing the re-encoded information.

6. An apparatus for wireless communications, comprising:
    at least one processor configured to receive a waveform for a plurality of transport blocks, each transport block comprising a plurality of code blocks, successfully decode one or more code blocks of one of the plurality of transport blocks, reconstruct a portion of the waveform utilizing the successfully decoded code blocks, and subtract the reconstructed portion from the received waveform to cancel interference caused by the successfully decoded code blocks; and
    a memory coupled with the at least one processor.

7. The apparatus of claim 6, wherein the waveform corresponds to a physical downlink shared channel (PDSCH).

8. The apparatus of claim 6, wherein the at least one processor is further configured to:
    monitor channel quality; and
    dynamically enable interference cancellation using the reconstructed portion of the waveform based on the successfully decoded code blocks when the monitored channel quality is above a threshold value.

9. The apparatus of claim 6, wherein the at least one processor is further configured to:
    perform a plurality of iterations of interference cancellation on the waveform, wherein each iteration comprises reconstructing a different portion of the waveform utilizing one or more successfully decoded code blocks, and subtracting the reconstructed portion from the waveform.

10. The apparatus of claim 6, wherein the at least one processor is configured to reconstruct the portion of the received message by:
    re-encoding information in the successfully decoded code blocks; and
    reconstructing the portion of the received waveform utilizing the re-encoded information.

11. An apparatus for wireless communications, comprising:
    means for receiving a waveform for a plurality of transport blocks, each transport block comprising a plurality of code blocks;
    means for successfully decoding one or more code blocks of one of the plurality of transport blocks;
    means for reconstructing a portion of the waveform utilizing the successfully decoded code blocks; and means for subtracting the reconstructed portion from the received waveform to cancel interference caused by the successfully decoded code blocks.

12. The apparatus of claim 11, wherein the waveform corresponds to a physical downlink shared channel (PDSCH).

13. The apparatus of claim 11, further comprising:
means for monitoring channel quality; and
means for dynamically enabling interference cancellation using the reconstructed portion of the waveform based on the successfully decoded code blocks when the monitored channel quality is above a threshold value.

14. The apparatus of claim 11, further comprising:
means for performing a plurality of iterations of interference cancellation on the waveform, wherein each iteration comprises reconstructing a different portion of the waveform utilizing one or more successfully decoded code blocks, and subtracting the reconstructed portion from the waveform.

15. The apparatus of claim 11, wherein reconstructing the portion of the received message comprises:
means for re-encoding information in the successfully decoded code blocks; and
means for reconstructing the portion of the received waveform utilizing the re-encoded information.

16. A computer-program product for wireless communications, comprising a non-transitory computer readable medium having instructions stored thereon, the instructions being executable by one or more processors for:
receiving a waveform for a plurality of transport blocks, each transport block comprising a plurality of code blocks;
successfully decoding one or more code blocks of one of the plurality of transport blocks;
reconstructing a portion of the waveform utilizing the successfully decoded code blocks; and
subtracting the reconstructed portion from the received waveform to cancel interference caused by the successfully decoded code blocks.

17. The computer-program product of claim 16, wherein the waveform corresponds to a physical downlink shared channel (PDSCH).

18. The computer-program product of claim 16, wherein the instructions are further executable by the one or more processors for:
monitoring channel quality; and
dynamically enabling interference cancellation using the reconstructed portion of the waveform based on the successfully decoded code blocks when the monitored channel quality is above a threshold value.

19. The computer-program product of claim 16, wherein the instructions are further executable by the one or more processors for:
performing a plurality of iterations of interference cancellation on the waveform, wherein each iteration comprises reconstructing a different portion of the waveform utilizing one or more successfully decoded code blocks, and subtracting the reconstructed portion from the waveform.

20. The computer-program product of claim 16, wherein reconstructing the portion of the received message comprises:
re-encoding information in the successfully decoded code blocks; and
reconstructing the portion of the received waveform utilizing the re-encoded information.

* * * * *